United States Patent
Niimi

Patent Number: 5,723,929
Date of Patent: Mar. 3, 1998

[54] D.C. MOTOR WITH PRIMARY AND AUXILIARY MAGNETIC POLES

[75] Inventor: Masami Niimi, Handa, Japan

[73] Assignee: Nippondenso Co., Ltd., Kariya, Japan

[21] Appl. No.: 640,436

[22] Filed: Apr. 30, 1996

[30] Foreign Application Priority Data

Sep. 19, 1995 [JP] Japan ................................. 7-239383

[51] Int. Cl.$^6$ ................................................. H02K 23/04
[52] U.S. Cl. ........................... 310/154; 310/254; 310/256; 310/156; 310/152
[58] Field of Search ............................. 310/154, 254, 310/256, 258, 156, 152

[56] References Cited

U.S. PATENT DOCUMENTS

| | | |
|---|---|---|
| 4,542,314 | 9/1985 | Corbach et al. . |
| 4,707,630 | 11/1987 | Tomite et al. ............... 310/154 |
| 4,777,717 | 10/1988 | Okamoto et al. ............ 29/596 |
| 5,109,172 | 4/1992 | Pace ................................ 310/154 |
| 5,276,375 | 1/1994 | Hartel ............................ 310/154 |
| 5,475,276 | 12/1995 | Shiga et al. ................... 310/154 |

FOREIGN PATENT DOCUMENTS

| | | |
|---|---|---|
| 57-12380 | 3/1982 | Japan . |
| 7-115759 | 5/1995 | Japan . |

Primary Examiner—Steven L. Stephan
Assistant Examiner—Timothy A. Williams
Attorney, Agent, or Firm—Cushman, Darby & Cushman IP Group of Pillsbury, Madison & Sutro LLP

[57] ABSTRACT

A direct current motor for vehicle engine starters includes a plurality of primary and auxiliary magnetic poles made of permanent magnets arranged between a cylindrical yoke and a cylindrical sleeve inside which an armature is rotatably supported. In order to fixedly support each auxiliary magnetic pole in position between circumferentially adjacent two of the primary magnetic poles, the primary magnetic pole is formed with slanted faces on both circumferential sides thereof to provide a radially inwardly decreasing circumferential width and the auxiliary magnetic pole is formed with slanted faces on both circumferential sides thereof to provide a radially inwardly increasing circumferential width, so that the primary magnetic poles presses the auxiliary magnetic poles radially inwardly when the slanted faces abut each other. Alternatively, the auxiliary magnetic poles may be pressed radially inwardly by concave portions formed integrally with the yoke, pressing members interposed radially inside the yoke, or engagement tongues extending integrally from the sleeve.

10 Claims, 2 Drawing Sheets

D.C. MOTOR WITH PRIMARY AND AUXILIARY MAGNETIC POLES

CROSS REFERENCE TO RELATED APPLICATION

This application is based on and claims the priority of Japanese Patent Application No. 7-239383 filed on Sep. 19, 1995, the content of which is incorporated herein by reference.

BACKGROUND OF THE INVENTION

1. Field of the Invention

The present invention relates to a direct current motor and, more particularly, to a direct current motor which has primary and auxiliary stator magnetic poles and may be used as a starter motor for vehicle engines.

2. Description of Related Art

It is known in the art of a direct current (d.c.) motor having stator magnetic poles composed of permanent magnets (e.g., JP-B2 57-12380) to interpose auxiliary magnetic poles to increase the motor output. Each of the auxiliary magnetic poles is disposed between adjacent circumferentially-arranged primary magnetic poles, with magnetic pole faces of the auxiliary magnetic poles which face circumferential side faces of the adjacent primary magnetic poles having the same magnetic polarity as that of the primary magnetic poles. This arrangement, reducing the magnetic flux leakage between the adjacent two of the primary magnetic poles, increases the effective magnetic flux which passes from the primary magnetic poles to a rotor (armature) through an air gap between the magnetic poles and the armature. This increase in the effective magnetic flux in turn increases the motor output.

It is not easy to fixedly support with sufficient mechanical strength the auxiliary magnetic poles between the primary magnetic poles, particularly in the case that the d.c. motor is used as a starter motor for vehicles in which it is mounted directly on a vehicle engine and subjected to strong vibration. Each auxiliary magnetic pole may be sandwiched between the primary magnetic poles by adhesive-bonding the respectively opposing circumferential side faces of the auxiliary magnetic pole and the adjacent primary magnetic poles. This fixing necessitates accurate dimensioning of the permanent magnets for the primary and auxiliary poles and, therefore, is not practical because of the resultant high machining or processing cost.

SUMMARY OF THE INVENTION

It is therefore an object of the present invention to provide an improved direct current motor with primary and auxiliary magnetic poles.

It is a further object of the present invention to provide a direct current motor which fixedly supports therein auxiliary magnetic poles in simple construction and low cost.

According to the present invention, auxiliary magnetic poles are interposed between circumferentially adjacent two of primary magnetic poles and pressed radially inwardly to an outer circumferential face of a cylindrical sleeve so that its radial movement is restricted. For this arrangement, the primary and auxiliary magnetic poles do not require high-accuracy machining or processing or adhesive-bonding, resulting in manufacturing cost reduction.

Preferably, the primary and auxiliary magnetic poles are formed with slanted faces and disposed on the outer circumferential face of the sleeve with the adjacent slanted surfaces contacting each other. Thus, each auxiliary magnetic pole is pressed radially in a wedge-like fitting configuration between the two opposing slanted faces of the adjacent primary magnetic poles. As a result, the auxiliary magnetic poles are fixedly supported both radially and circumferentially.

Preferably, each auxiliary magnetic pole is sandwiched between a pressing member and the cylindrical sleeve, as well as between the adjacent two of the primary magnetic poles, so that the auxiliary magnetic pole may be held more firmly. By forming the pressing member to have an inner or bottom planar face which abuts the outer circumferential face of the auxiliary magnetic pole, inclination of the auxiliary magnetic poles may be reduced to a minimum.

More preferably, the pressing member is made of an elastic material or in an elastically deformable shape to absorb variations in the thickness (radial dimension) of the auxiliary magnetic poles.

Preferably, the cylindrical sleeve is formed with engagement tongues which engages the outer faces of the auxiliary magnetic poles at both axial side ends to hold firmly the same radially and axially. The bending position of each engagement tongue may be varied in correspondence to the thickness of the auxiliary magnetic pole, thereby absorbing variations in the thickness of the auxiliary magnetic poles.

BRIEF DESCRIPTION OF THE DRAWINGS

Other objects, features and advantages of the present invention will be made more apparent in the following description with reference to the accompanying drawings, in which.

DETAILED DESCRIPTION OF PREFERRED EXEMPLARY EMBODIMENTS

The present invention will be described hereinunder in more detail with reference to various embodiments illustrated in the accompanying drawings.

(First Embodiment)

Figure 1:
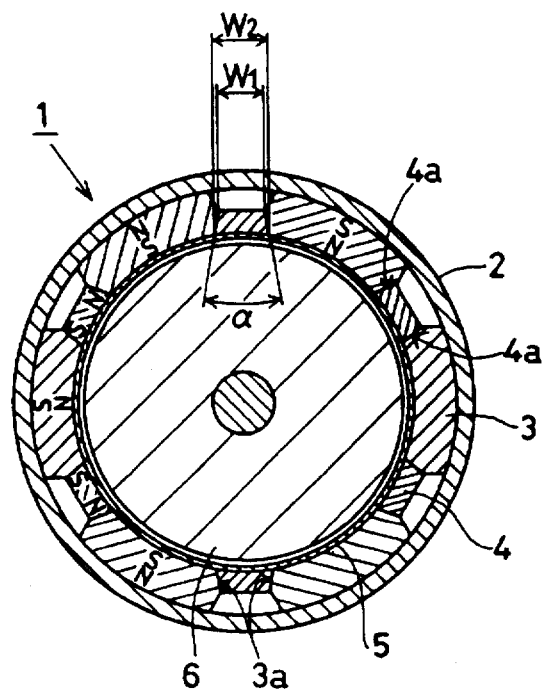
FIG. 1 is a sectional view illustrating a direct current motor according to a first embodiment of the present invention.

In a first embodiment shown in FIG. 1, a direct current (d.c.) motor 1 for a vehicle starter primarily has a stator and a rotor. The stator comprises a cylindrical yoke 2 made of a soft steel, a plurality (even number) of primary magnetic poles 3 disposed circumferentially inside the yoke 2 at a predetermined angular interval, a plurality (even number) of auxiliary magnetic poles 4 each interposed between the circumferentially adjacent two of the primary magnetic poles 3, and a cylindrical sleeve 5 fitted radially inside the inner faces of the primary and auxiliary magnetic poles 4 and 5. The rotor comprises an armature 6 rotatably supported radially inside the sleeve 5 in the manner known in the art.

Each primary magnetic pole 3 is made of a permanent magnet which is so magnetized to have the S (south)-pole and N (north)-pole at the radial ends thereof. Further the magnetic pole 3 is so disposed to provide the magnetic flux in a radial direction opposite to that of the circumferentially adjacent magnetic poles 3. That is, the magnetic poles 3 provide N-pole and S-pole alternately in the circumferential direction at the radially outside portion and inside portion. Each magnetic pole 3 is formed on both circumferential sides near the radial inside portion thereof with slanted faces 3a by which a circumferential width thereof decreases gradually radially inwardly, i.e., toward the cylindrical sleeve 5. Thus, each slanted face 3a of one magnetic pole 3 defines with the slanted face 3a of the adjacent magnetic poles 3 a wedge-like space having a predetermined angle ($\alpha$). The circumferential width of the space gradually decreases from W2 to W1 in a radial direction from the inner side (sleeve 5) toward the outer side (yoke 2).

Each auxiliary magnetic pole 4 is also made of a permanent magnet which is so magnetized to have the S-pole and N-pole at the circumferential ends thereof. More specifically, the S-pole and N-pole of the magnetic poles 4 are arranged to be adjacent to the N-pole and S-pole of the radially inside magnetic polarity of the circumferentially adjacent magnetic poles 3. Further, each magnetic pole 4 is formed with slanted surfaces 4a at both circumferential sides thereof to form a part of a wedge having the circumferential width decreasing radially outwardly to define the same angle ($\alpha$) as the slanted faces 3a. The magnetic poles 4 are fitted in the spaces provided between the two adjacent magnetic poles 3 with the slanted faces 4a abutting or in contact with the corresponding slanted faces 3a of the magnetic poles 3.

The sleeve 5 is made by rounding into a cylindrical shape a metal plate of about 0.3 millimeter in thickness (e.g., aluminum plate, stainless steel plate or the like) and fitted into radial inner faces of the magnetic poles 3 and 4 with a small gap relative to the outermost face of the armature 6. Primary magnetic poles 3 may be held fixedly between the yoke 2 and the sleeve 5 by press-fitting thereinto or by bonding with adhesive. The auxiliary magnetic poles 4, on the other hand, is held fixedly between the circumferentially adjacent primary magnetic poles 3 in a sandwiched manner and between the yoke 2 and the sleeve 5 with only the radial inner face thereof contacting the radial outer face of the sleeve 5. The auxiliary magnetic poles 4 may be held fixedly in an axial direction by bending a part of axial ends of the sleeve 5 radially outwardly to engage with the axial ends of the auxiliary magnetic poles 4.

As described above, according to the first embodiment, since the primary magnetic poles 3 and auxiliary magnetic poles 4 are formed with respective slanted faces 3a and 4a which engage each other, each auxiliary magnetic pole 4 may be sandwiched between the adjacent two of the primary magnetic poles 3 with its radial inner face firmly contacting the outer face of the sleeve 5. Thus, movement of the auxiliary magnetic poles 4 in the circumferential and radial directions may be restricted and held firmly in position. This fixing does not necessitate a high-accuracy machining or processing of the permanent magnets for the magnetic poles 3 and 4 and, therefore, is effective to fixedly support the auxiliary magnetic poles 4 in a simple construction and in low cost.

Further, even in the case that the circumferential widths of the magnetic poles 3 and 4 vary from piece to piece, such dimensional variations may be compensated for by expanding a part of the sleeve 5 between the primary magnetic poles 3 radially outwardly to the auxiliary magnetic poles 4.

Still further, even in the case that the auxiliary magnetic poles 4 come to be loosely fitted for some reason, its radial inward movement is restricted by the sleeve 5 and the auxiliary magnetic poles 4 do not interfere the armature 6, resulting in high reliability of motor operation.

Thus, owing to the simple construction for fixing the auxiliary magnetic poles 4, the d.c. motor 1 may be used as a starter motor for vehicle engines which is usually subjected to the harsh condition of strong vibrations and is most suited to a starter motor with a speed-reduction mechanism in a compact size.

(Second Embodiment)

Figure 2:
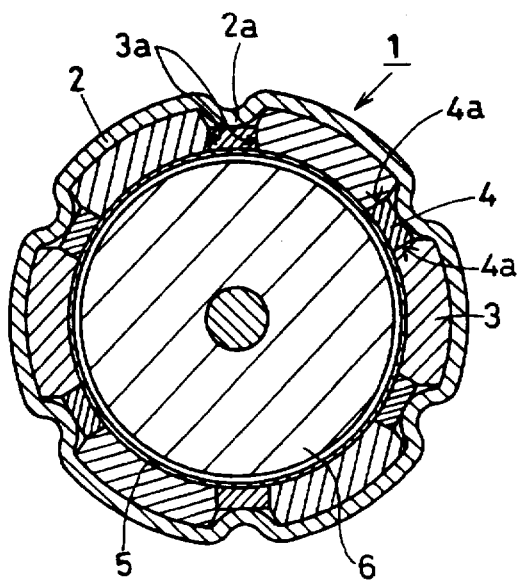
FIG. 2 is a sectional view illustrating a direct current motor according to a second embodiment of the present invention.

In a second embodiment illustrated in FIG. 2, the yoke 2 is formed with a plurality of concave portions 2a, each extending axially and radially inwardly, so that the concave portions 2a co-operatively with the cylindrical sleeve 5 sandwiches the auxiliary magnetic poles 4 radially. The circumferential side faces 3a and 4a of the primary and auxiliary magnetic poles 3 and 4 are generally formed in parallel to each other, respectively, so that the primary and auxiliary magnetic poles 3 and 4 have generally the respective uniform circumferential widths. That is, the circumferential width of the auxiliary magnetic poles 4 is determined to be in accord with the circumferential spacing between the two circumferentially adjacent primary magnetic poles 3.

The concave portions 2a presses the auxiliary magnetic poles 4 radially inwardly to fixedly support the same on the cylindrical sleeve 5.

In the case that the circumferential width of the auxiliary magnetic poles 4 becomes shorter than the circumferential spacing between the adjacent two of the primary magnetic poles 3 due to variations in the circumferential widths of the primary and auxiliary magnetic poles 3 and 4, a gap between the primary and auxiliary magnetic poles 3 and 4 may be produced. This gap in the circumferential direction, however, does not affect on the motor performance so adversely.

In respect of the thickness variations of the auxiliary magnetic poles 4 in the radial direction, in the same manner as in the first embodiment, the sleeve 5 may be expanded radially outwardly between the adjacent two of the primary magnetic poles 3 to compensate for the thickness variations and fixedly hold the auxiliary magnetic poles 4.

The concave portions 2a, if formed to have respective flat or planar bottom faces for a face contact with the radial outermost faces of the auxiliary magnetic poles 4, the auxiliary magnetic poles 4 may be prevented from tilting relative to the sleeve 5 and fixedly supported in position.

(Third Embodiment)

Figure 3:
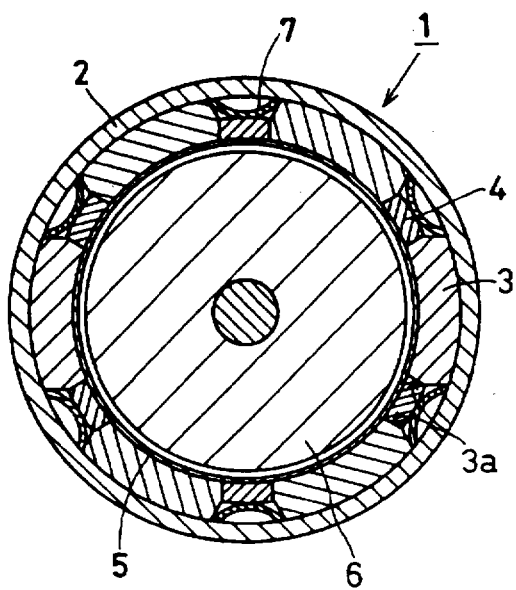
FIG. 3 is a sectional view illustrating a direct current motor according to a third embodiment of the present invention.

In a third embodiment illustrated in FIG. 3, a pressing member 7 is provided separately from the yoke 2 at a plurality of locations. Each pressing member 7 is disposed between the radial outer face of the auxiliary magnetic pole 4 and the radial inner face of the yoke 2 to sandwich the auxiliary magnetic pole 4 with the cylindrical sleeve 5. The pressing member 7 is made of a thin metal plate and press-formed into an arcuate shape in cross section. By arranging the pressing member 7 in an elastically deformable configuration, variations in the thickness of the auxiliary magnetic poles 4 may be absorbed within a flexing amount of the pressing member 7 and the magnetic poles 4 may be fixedly held in position. Alternatively, the pressing member 7 may be made of elastic materials such as a rubber material. Of course, it need not be formed into the elastically deformable configuration or made of the elastic material.

Being made of a thin plate, the pressing member 7 does not affect so much the leakage of magnetic flux and, hence, it may be made of either magnetic or nonmagnetic material. In the case of using a resinous material for the pressing member 7, its thickness may be increased. The pressing member 7 need not be formed into the arcuate shape in cross section (FIG. 3) but may be formed into other shapes, e.g., cylindrical shape.

As in the second embodiment, in the case that pressing member 7 is formed flat or planar at its bottom which abuts the auxiliary magnetic poles 4, the inclination of the auxiliary magnetic poles 4 relative to the sleeve 5 may be prevented effectively.

(Fourth Embodiment)

Figure 4:
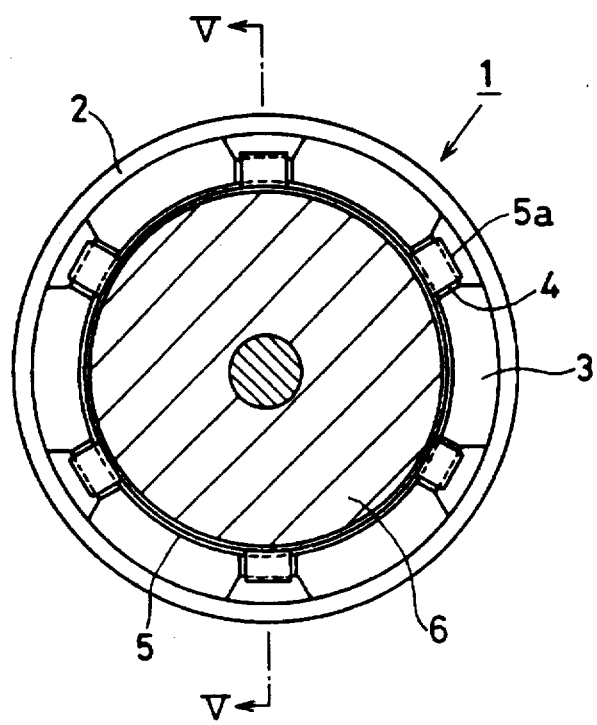
FIG. 4 is a sectional view illustrating a direct current motor according to a fourth embodiment of the present invention.
Figure 5:
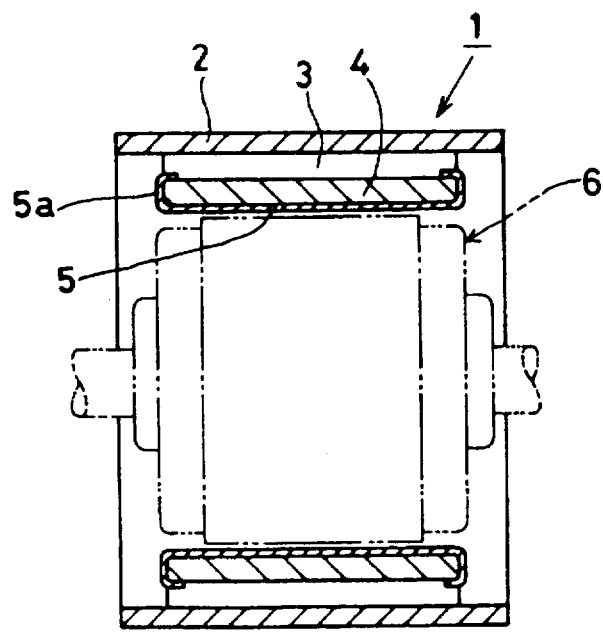
FIG. 5 is a sectional view of the motor taken along the line V—V in FIG. 4.

In a fourth embodiment illustrated in FIGS. 4 and 5, the cylindrical sleeve 5 is formed with a plurality of engagement tongues 5a to fixedly support the auxiliary magnetic poles 4.

In more detail, each engagement tongue 5a is formed into a rectangular shape and extends integrally from the axial ends of the cylindrical sleeve 5 at a circumferential position where the auxiliary magnetic pole 4 is disposed. As best illustrated in FIG. 5, the engagement tongue 5a is bent radially outwardly to cover the axial end of the adjacent auxiliary magnetic pole 4 and further bent axially to engage the radial outer face of the same. Thus, the engagement tongue 5a fixedly supports the auxiliary magnetic pole 4 in position, restricting movements of the auxiliary magnetic pole in both radial and axial directions.

According to the fourth embodiment, since the engagement tongue 5a may be bent at any position in correspondence to the thickness (radial dimension) of the auxiliary magnetic poles 4, variations in the thickness of the auxiliary magnetic poles 4 may be assuredly absorbed.

Although the present invention has been described hereinabove with reference to the d.c. motor for vehicle engine starters, it may be applied to other d.c. motors which uses permanent magnets for both primary magnetic poles and secondary magnetic poles disposed between the adjacent two primary magnetic poles. Other variations and modifications will be made by a person skilled in the art without departing from the scope and spirit of the present invention.

What is claimed is:

1. A direct current motor comprising a stator and a rotor, said stator including:

a plurality of primary magnetic poles including permanent magnets and disposed circumferentially;

a plurality of auxiliary magnetic poles including permanent magnets and interposed between circumferentially adjacent two of the primary magnetic poles;

a thin cylindrical sleeve fitted on radial inner faces of the primary magnetic poles; and supporting means pressing the auxiliary magnetic poles to a radial outer face of the sleeve to fixedly support the auxiliary magnetic poles in position, wherein:

each of the primary magnetic poles is formed with slanted faces on circumferential sides thereof to provide a varying circumferential width which decreases toward the sleeve;

each of the auxiliary magnetic poles is formed with slanted faces on circumferential sides thereof in correspondence to the slanted faces of the primary magnetic poles to provide a varying circumferential width which increases toward the sleeve; and the supporting means is provided by the slanted faces of the primary magnetic poles abutting circumferentially the slanted faces of the auxiliary magnetic poles.

2. A direct current motor comprising a stator and a rotor, said stator including:

a plurality of primary magnetic poles including permanent magnets and disposed circumferentially;

a plurality of auxiliary magnetic poles including permanent magnets and interposed between circumferentially adjacent two of the primary magnetic poles, each of said auxiliary magnetic poles having circumferential end faces substantially in contact with circumferential end faces of respective adjacent two of the primary magnetic poles;

a thin cylindrical sleeve fitted on radial inner faces of the primary magnetic poles; and supporting means pressing the auxiliary magnetic poles to a radial outer face of the sleeve to fixedly support the auxiliary magnetic poles in position, a cylindrical yoke provided around radial outer faces of the primary magnetic poles and formed as the supporting means and including a plurality of concave portions formed integrally between the circumferentially adjacent two of the primary magnetic poles to abut radial outer faces of the auxiliary magnetic poles and sandwich the auxiliary magnetic poles with the sleeve as the supporting means, first portions of circumferential end faces of adjacent two of said primary magnetic poles, disposed adjacent said cylindrical sleeve, being substantially parallel to each other, circumferential end faces of each auxiliary magnetic pole being substantially in parallel with each other and abutting said first portions of said circumferential end faces of said primary magnetic poles; and second portions of said circumferential end faces of adjacent two of said primary magnetic poles, disposed adjacent to said cylindrical yoke, being inclined so as to provide, radially outside said auxiliary magnetic poles, a spacing which has a circumferential width that increases in a direction towards said cylindrical yoke.

3. A direct current motor comprising a stator and a rotor, said stator including:

a plurality of primary magnetic poles including permanent magnets and disposed circumferentially;

a plurality of auxiliary magnetic poles including permanent magnets and interposed between circumferentially adjacent two of the primary magnetic poles, each of said auxiliary magnetic poles having circumferential end faces substantially in contact with circumferential end faces of respective adjacent two of the primary magnetic poles;

a thin cylindrical sleeve fitted on radial inner faces of the primary magnetic poles; and supporting means pressing the auxiliary magnetic poles to a radial outer face of the sleeve to fixedly support the auxiliary magnetic poles in position, a cylindrical yoke provided around radial outer faces of the primary magnetic poles, wherein the supporting means includes a plurality of pressing members each being disposed in a space provided radially inside the yoke and between the circumferentially adjacent two the primary magnetic poles to abut radial outer faces of the auxiliary magnetic poles and sandwich the auxiliary magnetic poles with the sleeve, first portions of circumferential end faces of adjacent two of said primary magnetic poles, disposed adjacent said cylindrical sleeve, being substantially parallel to each other, circumferential end faces of each auxiliary magnetic pole being substantially in parallel with each other and abutting said first portions of said circumferential end faces of said primary magnetic poles; and second portions of said circumferential end faces of adjacent two of said primary magnetic poles, disposed adjacent to said cylindrical yoke, being inclined so as to provide, radially outside said auxiliary magnetic poles, a spacing which has a circumferential width that increases in a direction towards said cylindrical yoke.

4. A direct current motor comprising a stator and a rotor, said stator including:

a plurality of primary magnetic poles including permanent magnets and disposed circumferentially;

a plurality of auxiliary magnetic poles including permanent magnets and interposed between circumferentially adjacent two of the primary magnetic poles;

a thin cylindrical sleeve fitted on radial inner faces of the primary magnetic poles; and supporting means pressing the auxiliary magnetic poles to a radial outer face of the sleeve to fixedly support the auxiliary magnetic poles in position, wherein:

the supporting means includes a plurality of engagement tongues extending from axial ends of the sleeve, the engagement tongues covering the axial ends of the auxiliary magnetic poles and engaging with radial outer faces of the auxiliary magnetic poles.

5. A direct current motor comprising a stator and a rotor said stator including:

a plurality of primary magnetic poles including permanent magnets and disposed circumferentially;

a plurality of auxiliary magnetic poles including permanent magnets and interposed between circumferentially adjacent two of the primary magnetic poles;

a thin cylindrical sleeve fitted on radial inner faces of the primary magnetic poles; and supporting means pressing the auxiliary magnetic poles to a radial outer face of the sleeve to fixedly support the auxiliary magnetic poles in position, wherein:

each of the primary magnetic poles is formed with slanted faces on circumferential sides thereof to provide a varying circumferential width which decreases toward the sleeve;

each of the auxiliary magnetic poles is formed with slanted faces on circumferential sides thereof in correspondence to the slanted faces of the primary magnetic poles to provide a varying circumferential width which increases toward the sleeve; and the supporting means is provided by the slanted faces of the primary magnetic poles abutting circumferentially the slanted faces of the auxiliary magnetic poles, wherein:

the sleeve has engagement portions extending from axial ends thereof radially outwardly to engage axial ends of the auxiliary magnetic poles.

6. A direct current motor according to claim 2, wherein:

the concave portions have respective flat bottom faces which abut the outer faces of the auxiliary magnetic poles.

7. A direct current motor according to claim 3, wherein:

the pressing members have respective flat bottom faces which abut the outer faces of the auxiliary magnetic poles.

8. A direct current motor according to claim 3, wherein:

the pressing members are each made of an elastic material.

9. A direct current motor according to claim 3, wherein:

the pressing members are each formed into a deformable shape.

10. A direct current motor according to claim 3, wherein:

the pressing members are each formed into an arcuate shape.

* * * * *